UNITED STATES PATENT OFFICE.

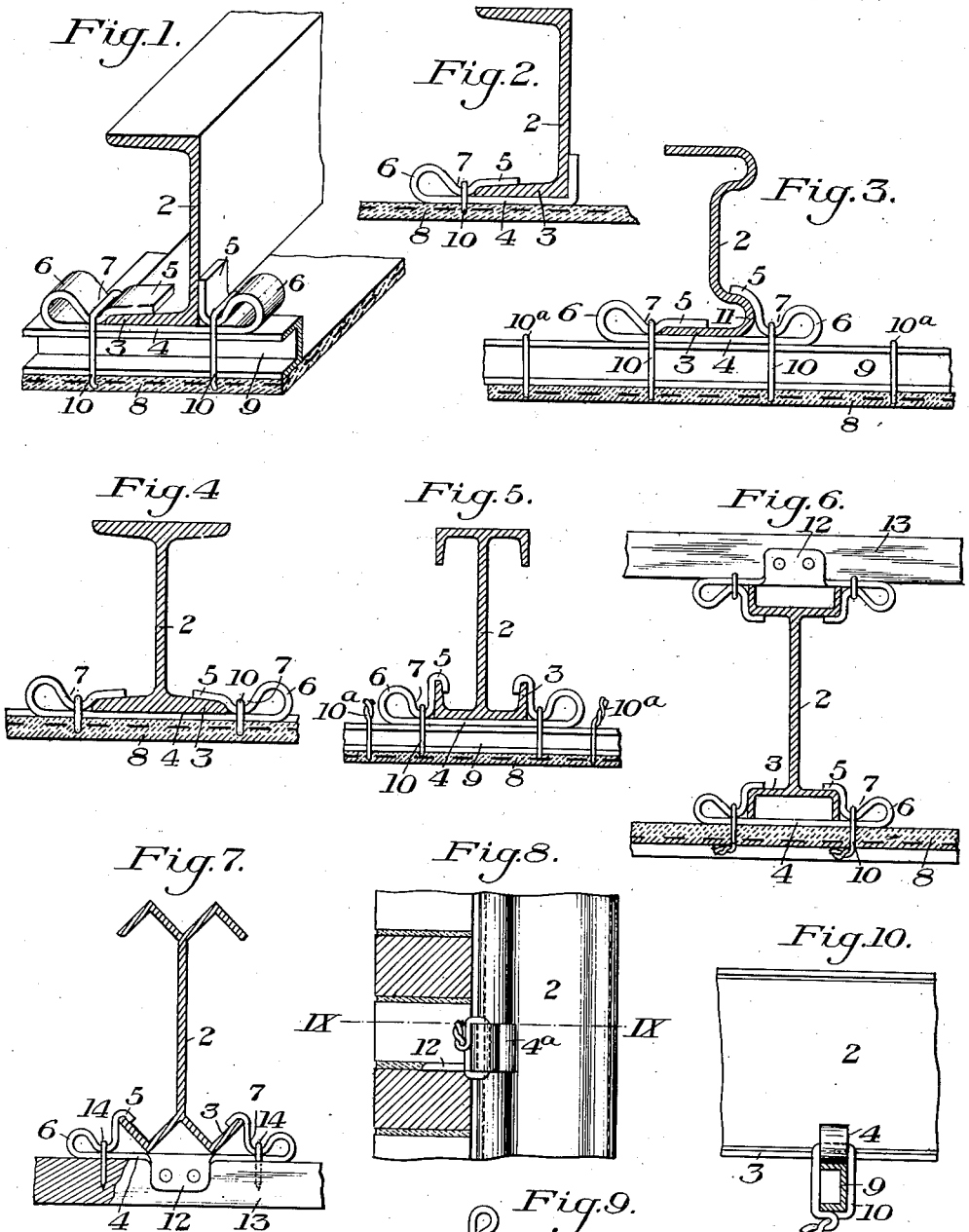

GEORGE H. BARBOUR, OF PITTSBURGH, PENNSYLVANIA.

METALLIC CLIP-FASTENING.

1,073,082.

Specification of Letters Patent.

Patented Sept. 16, 1913.

Application filed September 28, 1910. Serial No. 584,269.

*To all whom it may concern:*

Be it known that I, GEORGE H. BARBOUR, a resident of Pittsburgh, Allegheny county, and State of Pennsylvania, have invented a new and useful Improvement in a Metallic Clip-Fastening, of which the following is a full, clear, and exact description, reference being had to the accompanying drawings, forming part of this specification, in which—

Figure 1 is a perspective view partially in section of a channel having another channel sustaining a sheathing board secured to its flange with one form of my improved clip. Fig. 2 is a detail sectional view showing another form of my clip; Figs. 3, 4, 5, 6 and 7 are similar views showing the clip modified to suit the flanges of various sections of a general I-beam or channel shape; Fig. 8 is an end view of a clip similar to that shown in Fig. 1, but modified so as to secure wood or anchor brick and tile work to flanged sections; Fig. 9 is a sectional view on the line IX—IX of Fig. 8; and Fig. 10 is an end view of the clip for securing a channel section to an I-section.

My invention relates to an improvement in clips for attaching bars, rods, shapes, metal lath, wood, brick, tile, plastic boards or any form of sheathing to flanged sections.

The object of my invention is to provide a cheap, simple and effective clip or fastening of this character, which can be readily and quickly applied and which eliminates the punching of holes in the flanges of such sections for the attachment of wood strips to which the sheathing, etc., is secured, or of punching out tongues from the flanges to form hooks to which the strands of metal lath are secured.

The precise nature of my invention will be best understood by reference to the accompanying drawings, which will now be described, it being premised, however, that various changes may be made in the details of construction and general arrangement of the parts, without departing from the spirit and scope of my invention, as defined in the appended claims.

In the drawings, the numeral 2 designates the section to which the clips are secured, which may be provided with one or more flanges 3 at one or both ends of the web.

4 designates the body of the clip, having end extensions 5, which are bent upon themselves to engage a flange or some portion of the section 2.

6 is a loop formed at the junction of the body and end extension, and 7 are notches or grooves between the ends 5 and the loops 6, which are arranged to receive staples or wires for securing the clips to the section and the metal lath, slab or material which is to be secured to the sections by means of the clips.

In Fig. 1, I have shown a slab 8 connected to a small transverse channel section 9 which in turn is secured to the channel section 2. 10 are the wire bands in the grooves 7 of the clip and pass around the channel 9, the ends of each of the bands being secured together in any manner. In this figure, one end of the clip engages the flange 3, and the other end engages the web of the channel section 2.

In Fig. 2, I have shown a slightly modified form of clip having one end bent upon itself to engage the flange, while the other end is bent at right angles to engage the web of the section 2.

In Fig. 3, I have shown the ends of the clip bent to engage a flange 3 and a bead 11 of a special channel section 2. 10ª are bands for securing the slab 8 to the channel section.

In Fig. 4, I have shown the slab secured to an I-section without the interposed channel section, and in which both ends of the clip engage a flange of the section 2.

In Figs. 5 and 6, I have shown the clips engaging sections having different shaped flanges. The clip shown in the upper portion of Fig. 6 is provided with a lug or lugs 12, to which is secured a wooden nailing strip 13.

In Fig. 7, I have illustrated a clip similar to that shown in the upper portion of Fig. 6, and in which the ends 5 of the clip are bent to engage the flanges of another form of section. In this form, the ends of the strip are secured to the section and to the nailing strip by means of staples 14.

In Figs. 8 and 9, the clip 4ª is similar to that shown in Fig. 3, and is secured to the section in a manner similar to that shown in the upper portion of Fig. 6. The clip 4ª is also provided with a clip 12, which may be inserted between two bricks for securing brick veneering to the frame of a building, as shown in Fig. 8.

In Fig. 10, I have shown the clip arranged to secure small transverse channels 9 to the sections which may be used for supporting any material used in the construction of the building.

In applying the clip fastening, which preferably is made of elastic material, the turned over end or ends are forced apart sufficient to allow the clip to pass over the flange or flanges of the section when they spring or are sprung back into the position shown; the article to be attached is then brought into juxtaposition with the clip and a staple or staples embracing the grooved portion of the clip is passed around the article, or some strand of it, and its ends are secured together; except in cases where wood is to be secured to the sections, the staples may be driven directly into the article.

It is evident that all the clips shown may be modified to suit various articles and sections to which they are to be secured.

The advantages of my invention result from the provision of a clip which may be readily secured to the metal framing of a building, without punching the shapes, and to which clips may readily be secured, the supports for the partitions, sheathing, floors or roof, or to which the sheathing or partitions may be secured direct.

This application forms a continuation of my application Serial No. 464,730, filed November 27th, 1908, inasmuch as is common to both of them.

I claim:

1. A spring clip of the character described, comprising a body portion having an end extension bent upon itself, said end extension and the body portion forming a clamp for engaging a structural element, there being tie-receiving depressions in the clip between the bends and the clamping members, and means on the other end for engaging the opposite side of the structural element; substantially as described.

2. A spring clip of the character described, comprising a body portion having end extensions bent upon the body portion, said end extensions and the body portion forming clamps between the ends of the clip for engaging the flanges of a structural element, there being tie receiving depressions in the clip between the bends and the clamping members; substantially as described.

3. A spring clip of the character described, comprising a body portion having end extensions bent upon the body portion, said end extensions and the body portion forming clamps between the ends of the clip for engaging the flanges of a structural element, there being tie receiving depressions in the clip between the bends and the clamping members, and ties seated in said depressions and engaging the article to be supported thereby; substantially as described.

In testimony whereof, I have hereunto set my hand.

GEORGE H. BARBOUR.

Witnesses:
JESSE B. HELLER,
H. M. CORWIN.